May 16, 1939.   H. HEMMING ET AL   2,158,966

AIR CONDITIONING SYSTEM FOR PASSENGER VEHICLES

Filed March 13, 1937

INVENTORS
HAROLD HEMMING AND
CHARLES E. SWEET
by Robert J. Palmer
ATTORNEY

Patented May 16, 1939

2,158,966

UNITED STATES PATENT OFFICE 2,158,966

AIR CONDITIONING SYSTEM FOR PASSENGER VEHICLES

Harold Hemming, Dedham, and Charles E. Sweet, Mattapan, Mass., assignors to B. F. Sturtevant Company, Boston, Mass.

Application March 13, 1937, Serial No. 130,736

4 Claims. (Cl. 98—14)

This invention relates to air conditioning apparatus for passenger vehicles and relates more particularly to an air conditioner for railway passenger cars, employing water sprays for dehumidification in summer and which may be used for humidification in winter, and also employing heat exchange coils.

Spray type air conditioning units are believed to be preferable for railway passenger cars for the reason that not only do they afford better control of temperature and humidity but they act to clean the air more thoroughly and to remove odors. They have, however, certain inherent characteristics which have been held against them as disadvantages and which have prevented their greater use.

These characteristics are that a good design requires more space than the usual coil type unit, and the available space in a railway car is limited; they are subjected to much distortion and strain due to the movement of a car and are therefore difficult to maintain leakproof, and in the usual location in the roof zone of a car, provided for the air conditioning unit, access for servicing is troublesome.

According to a feature of this invention, a spray type unit large enough for satisfactory operation is provided by utilizing air blowers which are mounted above the ceiling in the vestibule and connected preferably by flexible connections to the spray unit which according to this invention occupies the space usually provided for the blowers and the conditioning unit.

According to another feature of this invention, the air conditioning unit is swung upon a support which absorbs the movement of the car and prevents it from being transmitted to the unit with the result that cracks and other openings cannot develop as they would if the unit was bolted to the car structure in the usual manner.

According to another feature of this invention, a hatch in the roof above the unit is provided. The unit is installed through this hatch and may be serviced therethrough.

One object of the invention is to provide for a passenger vehicle a spray type air conditioning unit which is equal in performance to the spray type conditioning units for buildings.

Another object of the invention is to provide space in a railway car for an adequate spray type conditioning unit by locating the air blowers in the space above the ceiling of the car vestibule.

Another object of the invention is to so support a spray type conditioning unit from the structure of a railway car that it is not subjected to deformation through movement of the car structure.

Another object of the invention is to provide in the roof of a railway car above a spray type conditioning unit a hatch providing access to the unit.

Other objects of the invention will be apparent from the following desription taken together with the drawing.

The invention will now be described with reference to the drawing, of which:

Figure 2:
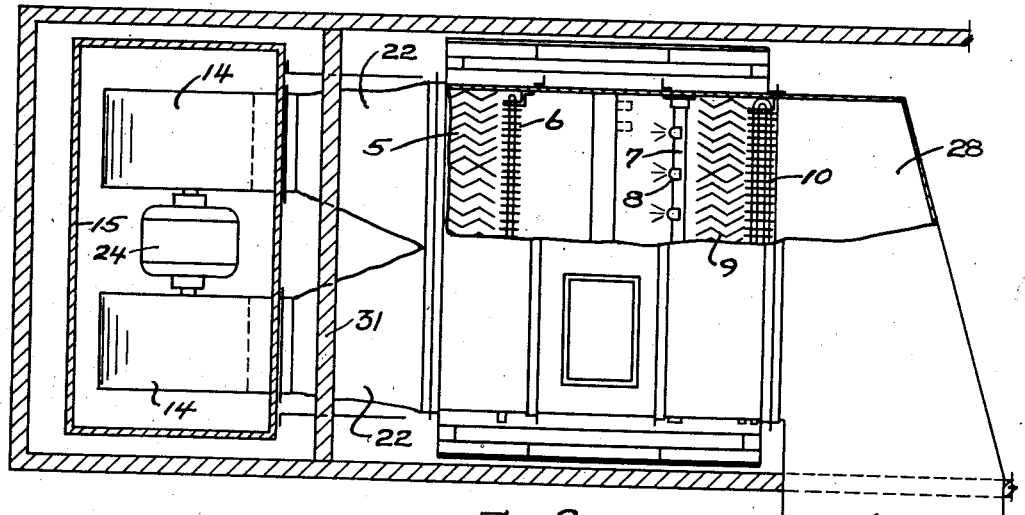
Fig. 2 is a plan view in section of that portion of the railway car shown by Fig. 1, with a portion of the conditioning unit in section.

The spray type conditioning unit shown in more detail by Fig. 2 contains in the order named, reading from left to right, the front eliminators 5, the precooler coil 6, the spray header 7 with spray nozzles 8, the rear eliminators 9, and the heating coils 10.

As illustrated there is a relatively great space between the precooler coil 6 and the spray nozzles. This space is required in order that sufficient air to water contact take place but its provision requires that the air conditioning unit have relatively great length.

Figure 1:
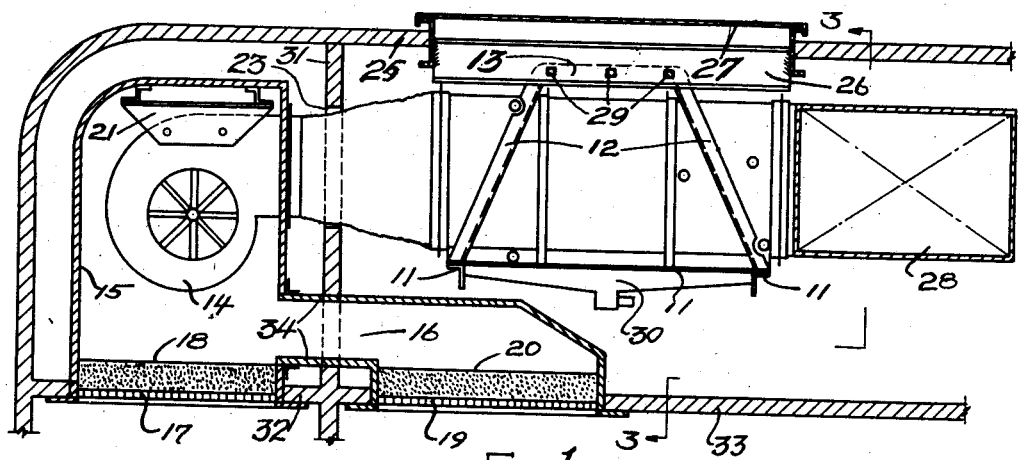
Fig. 1 is a side sectional view through the roof zone of a railway passenger car showing the installation of a spray type conditioning unit and its associated blowers according to this invention.
Figure 3:
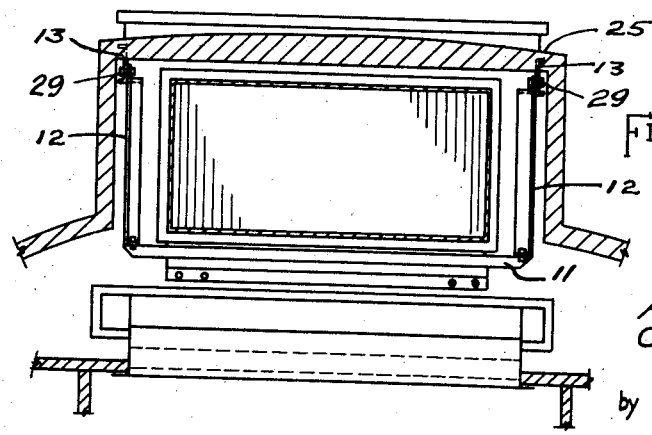
Fig. 3 is a sectional view along the lines 3—3 of Fig. 1.

The air washer unit is seated along the four sides of its base upon the structural base 11 which has a central opening through which the sump portion 30 of the air washer unit extends (Figs. 1 and 3). The base 11 is attached to the four supporting members 12, which are bolted (Fig. 3) to the structural members 13 which in turn is bolted at 29 (Fig. 1) to the frame of the car. The members 12 are relatively long and relatively flexible and bend during the side to side rocking and twisting of the car to shift the base 11 and with it the spray unit. By this construction the spray unit is swung from the frame of the car and moves as a whole upon its supporting frame and is not deformed as it would be if it was bolted directly to the car frame.

The two blowers 14 are contained in and supported from the casing 15 which, as shown by Fig. 7, is located above the ceiling of the vestibule of the car and has the portions 34 forming the walls for the recirculated air passage 16. The lower portion of the casing 15 contains the fresh air grille 17 and filter 18 mounted in an opening in the ceiling 32 of the vestibule, and the recirculated air grille 19 and filter 20, mounted in an opening in the ceiling 33 of the car interior.

The blowers are supported from the casing 15 by the mountings 21, and are connected to the spray unit by the flexible connections 22 which extend through the openings 23 in the wall 31 dividing the car vestibule from its interior. The blowers 14 are driven by the electric motor 24 which may be energized from the car battery.

The roof 25 of the car has a rectangular opening 26 having substantially the same outline as a horizontal section through the unit and this opening extends above the unit, whereby the unit may be installed and removed through this opening from overhead the car and may also be serviced therethrough. The hatch cover 27 closes the opening 26.

The air conditioning unit discharges into the passage 28 which leads to any preferred form of longitudinal supply duct.

While one embodiment of the invention has been described for the purpose of illustration, it should be understood that the invention claimed is not limited to the exact apparatus and arrangements described as many departures may be made by those skilled in the art without departing from the spirit of the invention.

What is claimed is:

1. Air conditioning apparatus for a railway passenger car comprising an air washer unit located in the roof zone of said car, a perforated structural base for supporting said unit, frame members extending upwardly from said base along converging lines to points above said unit, and means for attaching the upper ends of said frame members to said car adjacent the roof thereof for swinging said unit from the car structure, said unit having a lower sump extension extending through the perforation in said base to a point below said base.

2. Air conditioning apparatus for a railway passenger car comprising an air conditioning unit located in the roof zone of said car, a structural base for supporting said unit, frame members extending upwardly from said base along converging lines to points above said unit, means for attaching the upper ends of said frame members to said car adjacent the roof thereof for swinging said unit from the car structure, a blower mounted separately to the car structure, and a flexible connection between said blower and said unit.

3. In combination, a railway passenger car having a roof, an air washer unit located adjacent the roof, said roof having an opening above said unit, a hatch cover for normally closing said opening, a perforated structural base for supporting said unit, said unit having a lower sump portion extending through the perforation in said base to a point below same, a plurality of supporting members extending upwardly along converging lines from said base to said roof adjacent said opening, securing means accessible from said roof through said opening when said cover is removed for securing the upper ends of said members to said roof, said unit being removable through said opening, a blower mounted separately to the car structure, and a flexible connection between said blower and unit.

4. In combination, a railway passenger car having a vestibule separated by a wall from the car interior, an air washer mounted in the roof zone of said interior adjacent said wall, a blower mounted in the roof zone of said vestibule, said wall having an opening between said blower and said washer, a flexible connection extending from said blower through said opening to said washer, means forming a fresh air inlet in the ceiling of said vestibule, means forming a recirculated air inlet in the ceiling of said interior, and a continuous air guiding casing enclosing said blower and having extensions around said fresh air inlet and having extensions extending through said wall and around said recirculated air inlet.

HAROLD HEMMING.
CHARLES E. SWEET.